Feb. 15, 1944. J. N. FIELDS 2,341,913
ADJUSTABLE CUTTER BAR
Filed Sept. 6, 1941
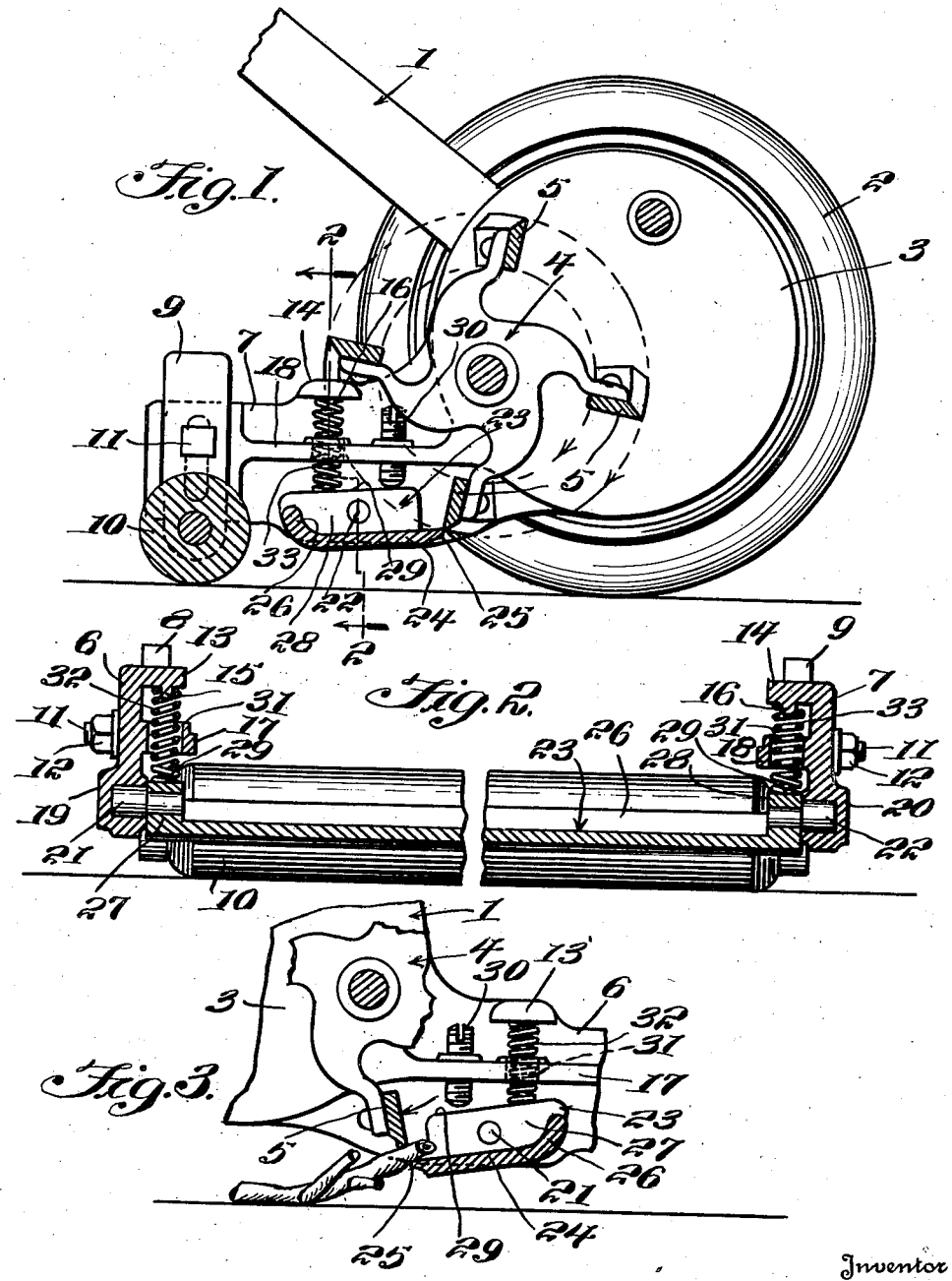
Inventor
Joy N. Fields
By Lacey & Lacey, Attorneys Patented Feb. 15, 1944

2,341,913

UNITED STATES PATENT OFFICE 2,341,913

ADJUSTABLE CUTTER BAR

Joy N. Fields, Mason City, Wash.

Application September 6, 1941, Serial No. 409,877

1 Claim. (Cl. 56—294)

This invention relates to lawn mowers and more particularly to an improved adjustable cutter bar.

One object of the invention is to provide an adjustable cutter bar which will, during the operation of the lawn mower, shift away from the cutting reel upon contact with a stick, nail, piece of wire, or other obstruction, so that danger of bending, breaking, or dulling of the cutter bar will be practically eliminated.

Another object of the invention is to provide an adjustable cutter bar which will shift away from the reel upon encountering an obstruction so that nicking of the blades of the reel will be largely prevented.

A further object of the invention is to provide a device of this character which may be easily installed and removed.

Still another object of the invention is to provide a cutter bar which may be readily adjusted with respect to the reel so that maximum cutting efficiency may be had at all times.

Still further objects of the invention, not specifically mentioned hereinbefore, will become apparent during the course of the following description.

In the drawing forming a part of my application:

Figure 1 is a longitudinal sectional view of a lawn mower equipped with my improved adjustable cutter bar, Figure 2 is a transverse sectional view on the line 2—2 of Figure 1, and Figure 3 is a detail sectional view showing the cutter bar as it would appear after being shifted away from the reel by contact with a stick.

In the drawing like numerals of reference designate like parts throughout the views.

The numeral 1 indicates in general a lawn mower of conventional design. The lawn mower 1 includes wheels 2, a frame 3 and a reel 4, said reel being of conventional design and including blades 5. The frame 3 includes side plates 6 and 7 which extend rearwardly of the lawn mower and adjustably support roller mounting plates 8 and 9. Between the roller mounting plates is mounted an elevating roller 10 of conventional design. Bolts 11, having nuts 12 thereon, adjustably connect the roller mounting plates 8 and 9 to the frame.

On the side plates 6 and 7, medially of their lengths and on their corresponding upper edges, are formed inwardly directed lugs 13 and 14. Formed on the lugs 13 and 14, respectively, and depending therefrom are integral centering pins 15 and 16. The purpose of the lugs 13 and 14 and the pins 15 and 16 will be set forth in more detail hereinafter. Extending longitudinally of the side plates 6 and 7, medially of their heights and beneath the lugs 13 and 14, respectively, are inwardly directed webs 17 and 18.

As best seen in Figure 2, the side plates 6 and 7 are formed with bosses which are apertured to define bearings 19 and 20. My improved cutter bar extends between the side plates 6 and 7 and includes trunnions 21 and 22 which are journaled in the bearings 19 and 20, respectively. The cutter bar, as indicated in general by the numeral 23, comprises a cutter plate 24 having a cutting edge 25. The cutter plate 24 is turned up at its rear portion to define a reinforced rib 26, and at its opposite ends, the cutter bar is formed with upstanding flanges 27 and 28, said flanges carrying the trunnions 21 and 22, respectively, and being formed with flat straight upper surfaces 29. As will be noted, the trunnions 21 and 22 are located substantially mid-way of the length of the flanges so that the cutter bar will be balanced in its mounting between the side plates 6 and 7. The cutting edge 25 is, of course, disposed to cooperate with the cutting edge of each of the blades 5 of the reel so that, when blades of grass are confined between the cutting edge 25 and the cutting edges of the blades 5, selectively, said blades of grass will be severed, in the conventional manner.

Threaded in the webs 17 and 18, near their corresponding forward ends, are set screws 30, said set screws having their corresponding lower ends contacting the forward end portions of the flat surfaces 29 of the flanges 27 and 28. Freely mounted within openings 31 of the webs 17 and 18 are springs 32 and 33, the spring 32 extending through the web 17 and the spring 33 extending through the web 18. As will be seen, the corresponding upper ends of the springs are anchored against the lugs 13 and 14 by the centering pins 15 and 16. The corresponding lower ends of the springs 32 and 33 bear against the flat surfaces of the flanges 27 and 28 respectively, near the corresponding rear ends of said flat surfaces and rearwardly of the trunnions 21 and 22. The springs 32 and 33 normally urge the rear end of the cutter bar downwardly so that the forward ends of the flanges will abut the set screws 30. The set screws 30 are, of course, adjusted for supporting the cutting edge 25 in a proper position with respect to the blades 5 of the reel 4.

In use, the roller 10 will first be adjusted for positioning the cutter bar 23 a desired height above the ground. As the lawn mower is moved over the ground, the reel will rotate and the blades thereof will cooperate with the cutter bar for cutting grass in the conventional manner, as heretofore explained. If the reel should pick up a stone or stick and move the same into contact with the cutter bar, said cutter bar will rock on the trunnions 21 and 22 and against the tension of the springs 32 and 33 to the position shown in Figure 3, for allowing the stick either to pass between the blade of the reel and the cutter bar or to be dislodged from between said reel blade and cutter bar. In any event, rocking of the cutter bar away from the reel will prevent nicking of the blade of the reel and also will prevent damage to the cutting edge of the cutter bar or to the cutter bar as a whole. The set screws 30 provide an abutment so that, when the obstruction has been dislodged, the cutter bar will return to normal operative position. The cutter bar may be adjusted simply by rotating the set screws and rocking said cutter bar on the trunnions 21 and 22. Downward movement of the set screws will, of course, rock the cutter bar against the tension of the springs 32 and 33 and will shift the cutting edge 25 away from the reel. When the set screws are rotated in the opposite direction, they will move upwardly within the webs 17 and 18. When this takes place, the springs 32 and 33 will rock the cutter bar for moving the cutting edge 25 toward the reel 4.

It is believed that, by the use of my improved cutter bar, increased efficiency in the operation of a lawn mower will be secured. The construction hereinbefore described is characterized by the utmost simplicity. Also, as will be apparent, the device may be readily installed and removed from the lawn mower when desired. It is thought that the construction and operation of my improved cutter bar will now be thoroughly understood.

Having thus described the invention, what is claimed as new is:

A lawn mower having a frame provided with side plates, said side plates being formed with intermediate longitudinally disposed inwardly extending reinforcing webs having their upper edges provided with overhanging lugs spaced vertically from said intermediate webs and provided with depending centering pins, there being openings formed in the webs and vertically alined with the centering pins, said side plates beneath the intermediate webs being provided with apertured bosses to form bearings, a reel carried by the frame and having blades each formed with a cutting edge, a cutter bar having a cutter plate formed with a cutting edge, said cutter bar having upstanding end flanges formed with trunnions journaled in said bearings and provided with an upturned reinforced rear portion, said flanges having upper flat edges, set screws threaded in the intermediate webs and engageable with the flat upper edges of the flanges at one side of the trunnions for positioning the cutting edge of the cutter plate to cooperate with the cutting edges of the reel blades for effecting a cutting operation upon rotation of the reel and movement of the lawn mover over a lawn, and springs extending through the openings in the intermediate webs and fitting around the centering pins, the lower ends of said springs engaging the flat upper edges of the flanges of the cutter bar near the rear ends of the flanges, said springs urging the cutter bar into engagement with the set screws and said cutter bar being movable against the tension of the springs for separating the cutting edge of said bar from the cutting edge of the adjacent reel blade upon engagement with an obstruction for preventing damage to the cutting edge of the cutter bar and the cutting edge of the reel blade.

JOY N. FIELDS.